(12) United States Patent
Acworth et al.

(10) Patent No.: US 6,497,069 B1
(45) Date of Patent: Dec. 24, 2002

(54) WEIGHTS AND SINKERS

(75) Inventors: Arthur Keith Acworth, Cleveland (AU); Kevin Glen Acworth, Cleveland (AU); Gary Acworth, Cleveland (AU)

(73) Assignee: Sandy Corrie (AU)

( * ) Notice: Subject to any disclaimer, the term of this patent is extended or adjusted under 35 U.S.C. 154(b) by 0 days.

(21) Appl. No.: 09/272,742

(22) Filed: Mar. 9, 1999

Related U.S. Application Data

(63) Continuation of application No. PCT/AU97/00588, filed on Sep. 9, 1997.

(30) Foreign Application Priority Data

Sep. 9, 1996 (AU) ............................................. 962.217

(51) Int. Cl.$^7$ ............................................. A01K 95/00
(52) U.S. Cl. .......................................... 43/44.9; 43/43.1
(58) Field of Search ............................ 43/44.87, 44.9, 43/44.96, 44.97, 44.91, 43.1

(56) References Cited

U.S. PATENT DOCUMENTS

| | | | | |
|---|---|---|---|---|
| 3,557,486 A | | 1/1971 | Wright | |
| 3,608,230 A | * | 9/1971 | Hribar | 43/44.89 |
| 3,852,907 A | * | 12/1974 | Haught | 43/44.9 |
| 3,953,934 A | * | 5/1976 | Visser | 43/42.06 |
| 4,008,539 A | * | 2/1977 | Gardner | 43/44.9 |
| 4,137,664 A | * | 2/1979 | Beres | 43/43.1 |
| 4,279,092 A | * | 7/1981 | Hutson | 43/44.91 |
| 4,649,663 A | * | 3/1987 | Strickland | 43/44.9 |
| 4,780,981 A | * | 11/1988 | Hayward | 43/44.89 |
| 4,785,572 A | * | 11/1988 | Crumley | 43/44.9 |
| 4,837,966 A | * | 6/1989 | Bethel | 43/44.9 |

(List continued on next page.)

FOREIGN PATENT DOCUMENTS

| | | |
|---|---|---|
| AU | A-17399/88 | 6/1988 |
| AU | 17399/88 * | 12/1988 |
| EP | 0693253 * | 3/1995 |
| EP | 0-693-253 A1 | 1/1996 |
| GB | 2048631 A1 * | 12/1980 |
| GB | 2139861 A | 11/1984 |
| GB | 2139861 * | 11/1984 |
| WO | PCT/AU95/00846 | 12/1995 |
| WO | PCT/AU96/00775 | 12/1996 |

OTHER PUBLICATIONS

Derwent Abstract 1983–761022, High–strength sintered article prodn.—using low alloy steel comprising carbon, manganese, chromium, molybdenum iron etc., and zinc stearate as lubricant.*

Derwent Abstract 1977–44053Y, Heat and corrosion resistant sintered alloy—is decarburised in surface layers before enamelling.*

Derwent Abstract 1968–1733Q, Plasticised polyvinyl acetate as binder for powders.*

(List continued on next page.)

*Primary Examiner*—Darren W. Ark
(74) *Attorney, Agent, or Firm*—Wallenstein & Wagner, Ltd.

(57) ABSTRACT

This invention provides a method of providing a barrier coating over the surfaces of a plurality of sinkers (10), each having a line passageway (21) therethrough, and to sinkers (10) having a barrier coating (25, 27) over the exposed surfaces thereof including the line passageway (21). According to the invention, sinker bodies (11) are pressed from metal iron powder and immersed to paint the line passageway (21). The external surface of the body (11) is then cleaned so that the sinker may be handled leaving the passage coating (26) intact. The body is conveyed through successive spray stations at which opposite sides are painted and rolled over between painting stations for this purpose. Different barrier coatings such as epoxy coatings may be applied to the line passageway and the exterior surface.

6 Claims, 4 Drawing Sheets

U.S. PATENT DOCUMENTS

| | | | | |
|---|---|---|---|---|
| 4,942,689 A | * | 7/1990 | Link et al. | 43/44.9 |
| 4,964,236 A | * | 10/1990 | Adams | 43/44.9 |
| 4,965,956 A | * | 10/1990 | Bethel | 43/44.9 |
| 5,241,776 A | * | 9/1993 | Adams | 43/44.9 |
| 5,588,248 A | * | 12/1996 | Cornell et al. | 43/44.9 |
| 5,786,416 A | * | 7/1998 | Gardner et al. | 43/43.1 |
| 5,878,525 A | * | 3/1999 | Metzler | 43/44.94 |
| 5,918,408 A | * | 7/1999 | Laney | 43/44.9 |
| 6,076,297 A | * | 6/2000 | Lippincott | 43/44.87 |
| 6,145,240 A | * | 11/2000 | Adams et al. | 43/43.1 |
| 6,327,808 B1 | * | 12/2001 | Zascavage | 43/44.9 |

OTHER PUBLICATIONS

WO 97/19591, Jun. 1997, Improvements to weights and sinkers. Acworth et al.*

WO 97/09875, Mar. 1997, Fishing Sinker, McDonald.*

A review of the environmental impacts of lead shotshell ammunition and lead fishing weights in Canada, Aug. 1997.*

Canadian Wildlife Service—Occasional Paper No. 88—"A Review of the Environmental Impacts of Lead Shot Shell Ammunition and Lead Fishing Weights in Canada"—1995—ISBN: 0–662–23633–5.

* cited by examiner

FIG. 5
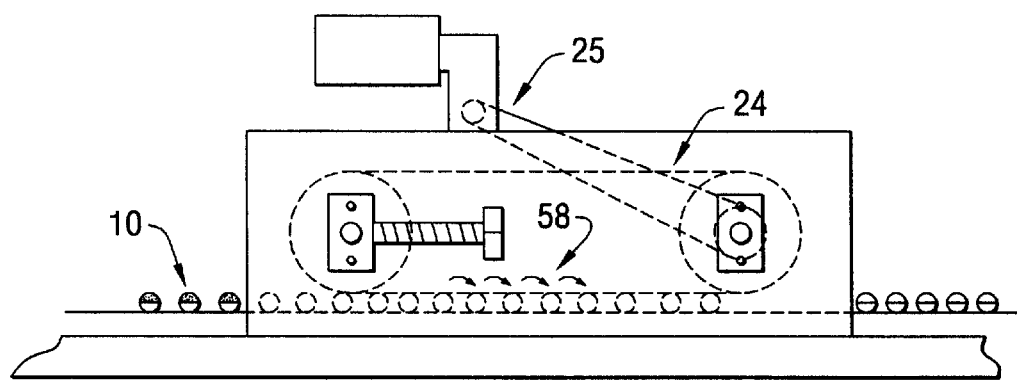
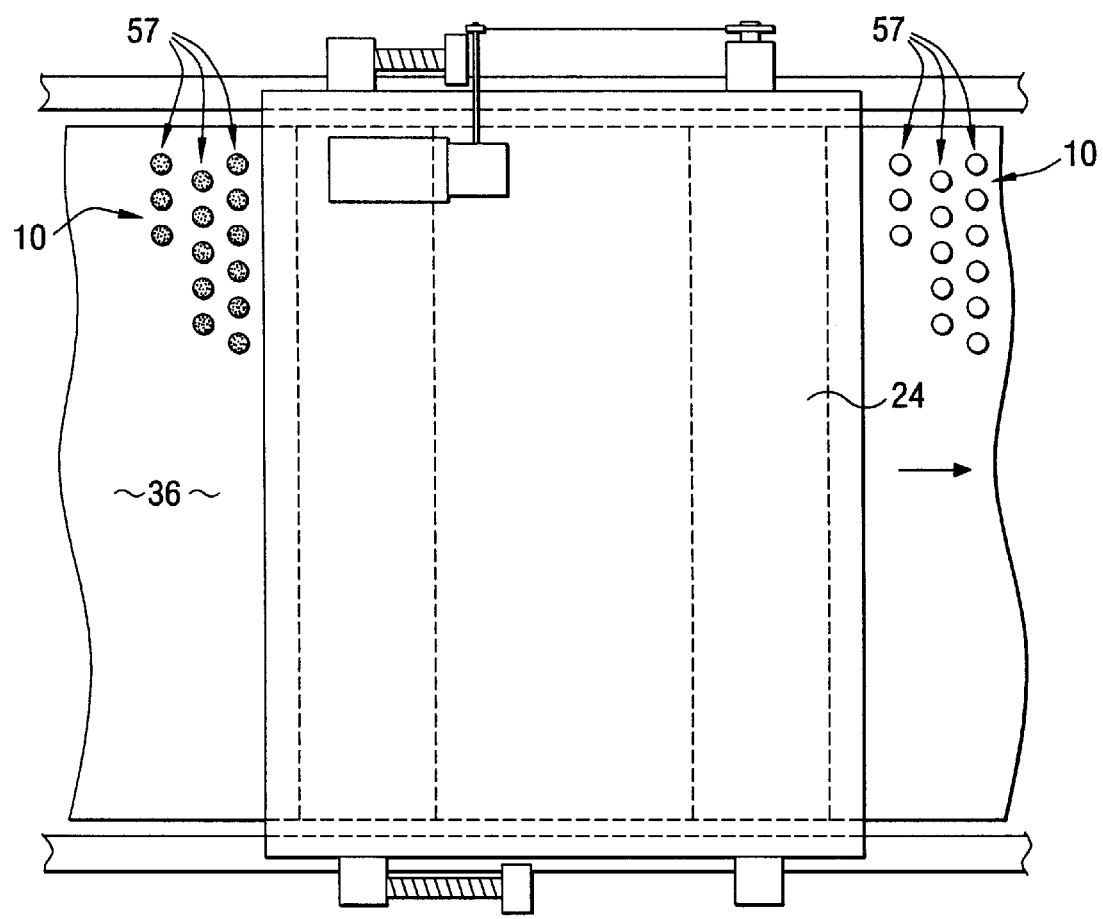

WEIGHTS AND SINKERS

This invention relates to weights and sinkers and methods of manufacturing same.

BACKGROUND OF THE INVENTION

This invention has particular application to sinkers for underwater use, such as those used for fishing lines and as weights for diving belts and the like. Such weights and sinkers will hereinafter be referred to collectively as sinkers.

Large quantities of lead are used to manufacture sinkers, especially for fishing lines and nets and the like and for diver's weight belts. Sinkers are mostly formed from lead which is toxic and are often manipulated by hand and thus they expose many persons, and especially young persons, to potential contamination from the lead from which they are formed. Furthermore, many sinkers, and particularly fishing line sinkers are lost during use and litter the beds of fish habitats. This constitutes a significant contamination of fish habitats which is difficult to remove or reduce.

The present invention aims to alleviate at least one of the above disadvantages and to provide sinkers and methods of manufacturing sinkers which will be efficient in use.

BRIEF SUMMARY OF THE INVENTION

With the foregoing in view, this invention in one aspect resides broadly in a sinker having a non-toxic metal body provided with a line passageway therethrough and a non-toxic barrier material coating all surfaces of the sinker body whereby the body material is isolated from interaction with the surrounding atmosphere or water.

The sinker bodies are preferably formed from steel and may be formed by being supplied as cylindrical steel billets fed randomly to a forge in which the billet is forged between heads having part-spherical cavities into a substantially spherical shape and finished with a passageway therethrough. Alternatively the sinker bodies may be cast from steel or iron or folded or formed from blanks about a mandrel or in such a manner that a line passageway remains through the formed body.

Preferably the body is formed from non-toxic metal powder which may be ferrous or non-ferrous metal powder. Advantageously, the body is formed from a non-toxic magnetic material so that lost sinkers, especially in an underwater environment in a localised fish habitat, may be readily recovered by scanning with a suitable magnet to recover the sinkers.

In the preferred form the body is formed from compressed iron powder and more preferably iron powder which contains a lubricant such as zinc stearate and which is sintered to at least some extent to increase its resistance to breakage due to impact. Suitably the iron powder is compressed at a pressure of about forty-five tons per square inch, providing a decrease in volume of the iron powder of about two and one-half times.

Suitably the compressed powder metal body is formed in a cylindrical passage in a die into and/or through which opposed punches move to compress a measured quantity of metal powder therebetween.

Preferably one punch supports a reciprocable pin about which the metal powder is compressed and the opposing punches are moveable through the die after the pressing process to remove the compressed body from the cylindrical passage. Thereafter the pin is withdrawn into its supporting punch to dislodge and discharge the compressed body therefrom It is also preferred that the compressed powder metal body discharged from the compression means be sintered in an oven for increasing the strength of the body. The body may be sintered in known manner at high temperatures in the order of 1100° C. in an oven in the presence of an inert gas such as nitrogen which flows through the oven.

Preferably however where the metal powder is iron powder, the sintering process is performed as a low temperature process in which the temperature in the oven is maintained below that which will cause visible oxidisation of the body such that the presence of an inert gas is not required. This also enables a relatively low cost bell-type oven to be utilised.

Preferably the sintering process is performed in the range of 350° C. to 800° C. for about thirty minutes so that the sintered body is generally capable of withstanding a throwdown test onto a concrete floor. Bodies tested in this manner prior to the sintering process mostly fail and shatter.

It is further preferred that the barrier material is a non-metallic coating material which is inert in its intended environment. However the coating may be an electroplated coating.

The barrier material is preferably a coating applied to the body in liquid form or spray form but it may be applied in powder form and bonded thereto. The barrier material is suitably a polymer coating which when cured exhibits properties of chemical resistance and toughness. It may be a polyurethane resin coating or water reducible one or two pack polyurethane coating or a combination thereof.

The barrier material may be applied in a process such as that described in our co-pending International patent application No. PCT/AU96/00775 or it may be applied as described below.

Preferably the coating material is suitable for application directly to the body but if desired it may be applied to a primed body primed with a compatible primer. A preferred barrier coating is an epoxy resin coating applied to the sinker body. The epoxy resin coating may be a water reducible coating or a conventional two-part epoxy resin coating.

Preferably the coating for the line passage is less resistant to degradation in an underwater environment than the coating on the outer surface of the body such that in time the passage coating will degrade and expose the metal body to the degrading effects of an underwater environment, especially a saltwater environment.

For this purpose the line passage is preferably coated with a water reducible paint such as a water reducible epoxy resin and the outer surface of the body is coated with a conventional two-part epoxy resin This provides a tougher outer surface to withstand abrasion and impact from which the line passage is shielded. Thus a long shelf life may be achieved together with a reduced underwater life.

In a further aspect it is preferred that the sinker adapted for use with fishing line be coated with a coloured or a selection of barrier material colours which is selected for either camouflaging the presence of a sinker In an underwater fish habitat or for providing a fish attractant. As a fish attractant, the barrier material may include metal flakes or like particles of a distinctly different colour to the base coating which sparkle or reflect light. The base coating may also be a multi coloured coating.

In yet a further aspect this invention resides broadly in a method of providing a barrier coating over the surfaces of a plurality of sinkers each having a line passageway therethrough, the method including:

submerging the sinker in a bath of coating liquid able to flow into and coat the line passageway;

withdrawing the sinker to a cleaning station at which the coating liquid is substantially removed from the external surface of the sinker;

arranging the sinkers in spaced apart relationship on a conveyor;

painting the portions of the sinker exposed above the conveyor with a barrier coating and causing the coating to harden;

rolling the sinkers along on said conveyor to a position at which the sinkers are supported on the conveyor on their painted side;

painting the newly exposed portions of the sinker with a barrier coating and causing the coating to harden.

Preferably the painting operations are performed automatically at separate spray paint stations and the sinkers are transported to the spray paint stations on the conveyor. It is also preferred that the sinkers be fed randomly from the cleaning station to location means at which the location means provides separate locating positions in space apart relationship for receiving individual sinkers and being disposed above the conveyor, and the location means is operable to deposit the located sinkers onto the conveyor in aligned closely spaced rows of sinkers.

Preferably the painting operations are performed automatically at separate spray paint stations and the sinkers are transported to the spray paint stations on said conveyor.

It is further preferred that the conveyor assembly is a belt type conveyor having a consumable layer of sticky faced material, such as automotive fire rated masking tape, which receives sinkers in the pattern formed by the primary location means and positively holds the sinkers In that pattern. When supported on this layer the freshly part painted sinkers may be passed through a heating zone for quick hardening of the paint.

Suitably the pattern has the sinkers arranged in staggered rows whereby a minimum space of about 2 mm may be maintained between adjacent sinkers. This allows the upper surface of the sinkers to be spray painted without concern for the sinkers moving and contacting one another.

It is further preferred that in the rolling process all but the leading or trailing row of sinkers are rolled along the sticky faced material onto the unpainted sticky space previously occupied by another adjacent sinker whereby they are again positively located in spaced apart relationship for further treatment painting.

BRIEF DESCRIPTION OF THE DRAWINGS

In order that this invention may be more readily understood and put into practical effect, reference will now be made to the accompanying drawings which illustrate a typical embodiment of the invention adapted for coating fishing line sinkers and wherein:

FIG. 1B illustrates closure of the punch; FIG. 1C illustrates compression of the metal powder; and FIG. 1D illustrates removal of the formed sinker from the die.

FIG. 5 illustrates the roll-over process for the part painted sinkers and

DETAILED DESCRIPTION

Figure 1:
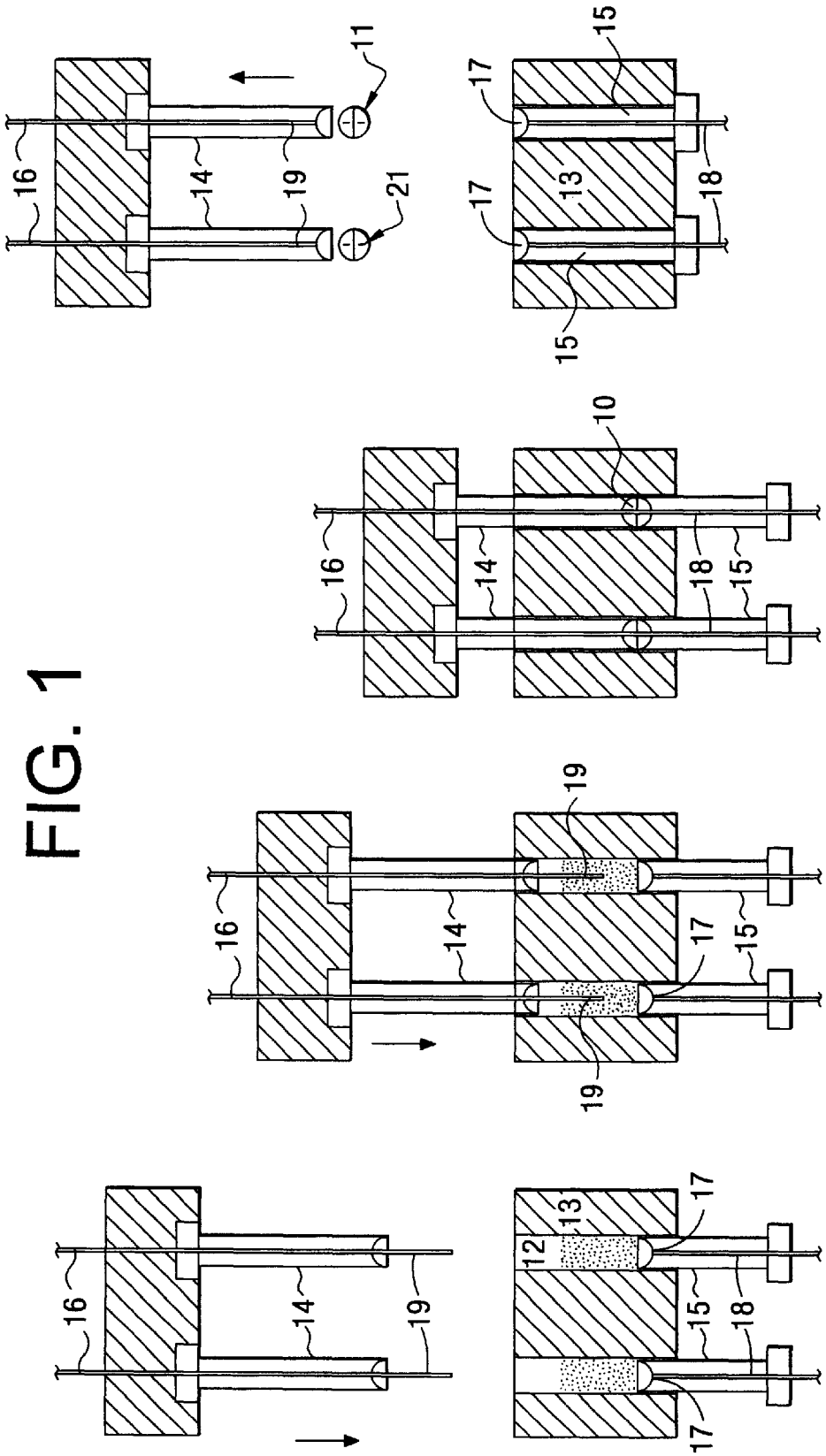
FIG. 1 provides a series of diagrammatic cross-sectional views showing the punch and dies operations, where in FIG. 1A illustrates the filling of the metal power.
Figure 2:
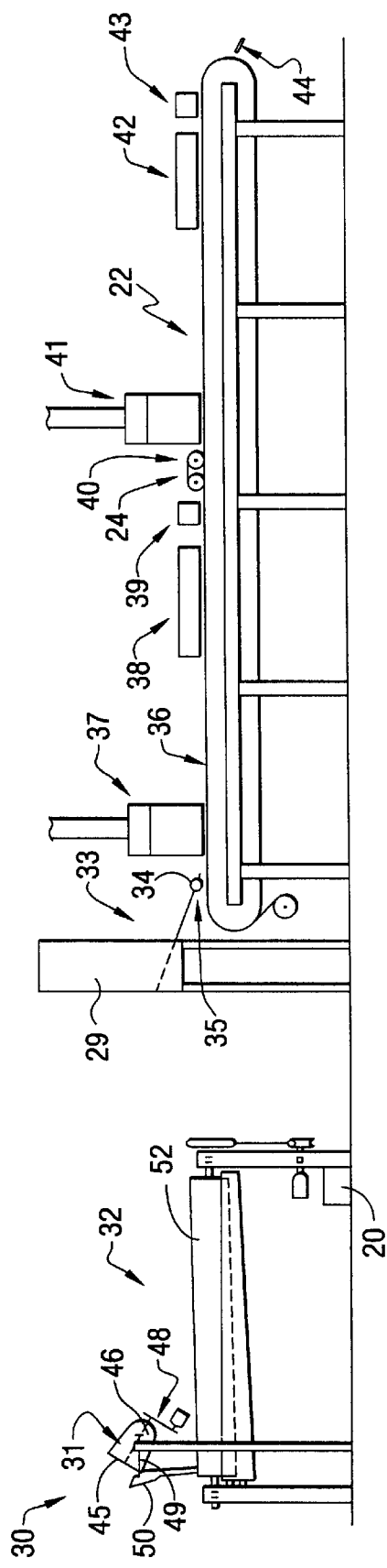
FIG. 2 is a diagrammatic elevational view of a preferred form of painting apparatus.
Figure 3:
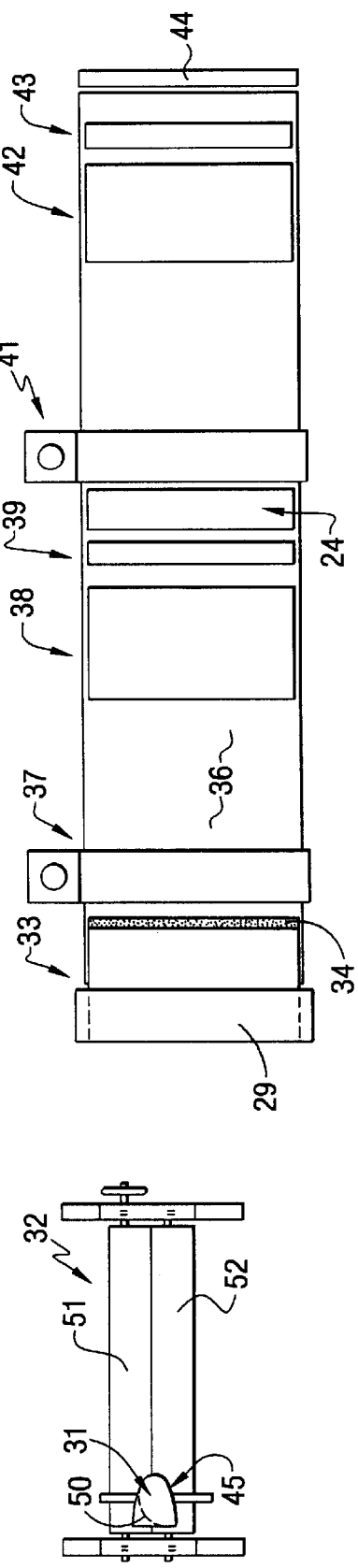
FIG. 3 is a diagrammatic plan view of the painting apparatus.

The sinkers 10 of this embodiment each have a body 11 formed from fine iron powder which is compressed under high pressure, in the order of 45 tons per square inch, in a cylindrical passage 12 provided in a die 13 into and/or through which upper and lower cupped punches 14 and 15 move to compress a measured guantity of iron powder therebetween.

While the upper bolster of the punch supports a plurality of punch members 14 and the die has a corresponding number of passages 12 and lower punches 15, for illustrative purposes reference will be made to the operational sequence of one punch and die set.

The upper punch 14 supports a reciprocable pin 16 having a lower extension 19 about which the metal powder is compressed. The lower punch 15 also supports a moveable pin 18 which is biased by spring means, not shown, into a blanking position across the upper end of the passage 17 within which the lower pin is constrained for movement.

The cupped lower punch 15 commences a cycle by closing the passage 12 for receipt of the measured quantity of metal powder within the passage 12. As illustrated in FIG. 1A, the upper punch 14 is clear of the die for this filling operation and the lower pin 18 blanks off the upper end of the passage 17.

After filling, the upper punch 14 with the pin 16 extended therefrom is engage within the passage 12 and moves therethrough to locate the lower end of the pin 16 in the corresponding passage 17 extending from the floor of the lower punch 15. As this passage 17 is normally closed by the upper end of a closure pin 18, the upper pin 16 must displaces the lower pin 18 for receipt in the upper end of the passage 17.

Thereafter continued movement of the punches 14, 15 towards one another, as illustrated in FIG. 1C, compresses the metal powder to approximately two fifths its uncompressed volume to form the substantially spherical sinker 10 about the pin 16. This pressing operation forms a very dense polished skin which mirrors the polished moulding surfaces of the punches 14, 15.

Punches with other than semi-spherical recesses therein may be utilised to form bean shaped or conical ended sinkers if desired.

After the sinker body 11 has been formed, the lower punch 15 is pushed upwardly through the die 13 to force the sinker body from the passage 12. The sinker body 11 is then carried on the pin 16 until the pin is retracted through the punch 14 to discharge the body 11 which is collected for sintering. This is Illustrated in FIG. 1D.

Figure 6:
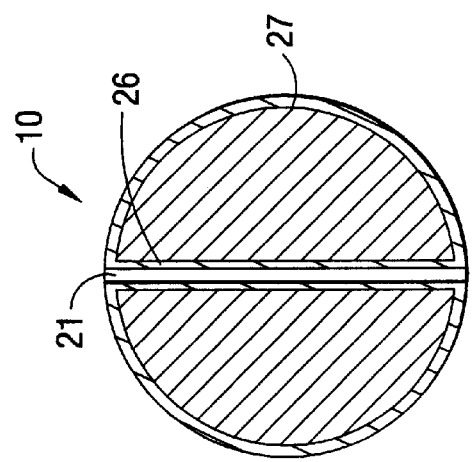
FIG. 6 is a cross-sectional view of a round sinker made in accordance with the present invention.

The sintering process is carried out as a batch process in a bell oven at about 350° C. Heating continues for about thirty minutes before the sintered bodies are discharged directly into the atmosphere for relatively quick cooling. At this elevated temperature noticeable oxidising of the bodies does not occur, however the strength of the green bodies from the pressing process is greatly enhanced. Typically the sintered bodies will withstand a throw down test onto a concrete floor whereas the green bodies will not The bodies 11 are then ready for coating to form a sinker 10 in accordance with the present invention as illustrated in FIG. 6 and having a body 11, a line passage 21 therethrough which is painted with a water reducible epoxy paint 26 and an exterior surface 27 painted with a two part epoxy resin.

Referring to FIGS. 2 to 5 it will be seen that the illustrated coating process is utilised to coat round sinker bodies 11 formed with a line passageway 21 therethrough to enable the sinkers to be threaded onto a fishing line. The coating process is performed in two stages as the sinkers pass continuously along a belt conveyor assembly 22 covered in sticky paper.

The coating apparatus 30 includes a dipping station 31 at which a water reducible epoxy paint is caused to coat the line passage 21, a paint stripping station 32 at which the paint is stripped from the external surface of the sinker bodies 11 leaving the line passage coating intact, a sorting and location station 33 to which the sinkers are randomly fed from the dipping station into the open upper end of the hopper 29 and sorted into staggered rows of sinker bodies 11 in a recessed roller 34, a transfer station 35 at which the aligned rows of sinker bodies 11 are fed on a conveyor 36, a first spray painting station 37 through which the sinker bodies 11 are fed to coat their exposed upper side, a first curing station 38 at which the part-painted bodies 11 are heated to about 120° C. for a few minutes, a air cooling station 39, a rolling station 40 at which the sinkers are rolled, as at 58 along the conveyor to expose their unpainted side, a second spray painting station 41 followed by a further curing station 42, cooling station 43 and a stripping station 44 at which the painted sinkers 10 are stripped from the conveyor 36.

The dipping station 31 includes a barrel 45 having its lower portion containing a water reducible epoxy bath 46. The barrel 45 is provided with an internal collector fin 49 fixed thereto and is rotated about its axis by a belt drive assembly 48 such that sinkers may rest in the bottom of the barrel 45 submerged in the bath 46 awaiting engagement by the collector fin 49.

The fin 49 extend inwardly and in the direction of rotation of the barrel 45 so that, during its rotation sinkers will be retained behind the collector fin 49 and carried to an upper position from which they will spill onto a guide 50 for delivery to the paint stripping station 32. At this station uncured paint on the outer surfaces of the dipped sinkers will be stripped by engagement with the constantly wet abutting rollers 51, 52 which contra-rotate and between which the sinker bodies 11 are conveyed.

The cleaned sinkers fall from the rollers 51, 52 into a collection bin 20. In this operation, any membrane which may have formed across the line passageway 21 will rupture upon impact at the collection bin 20.

Figure 4:
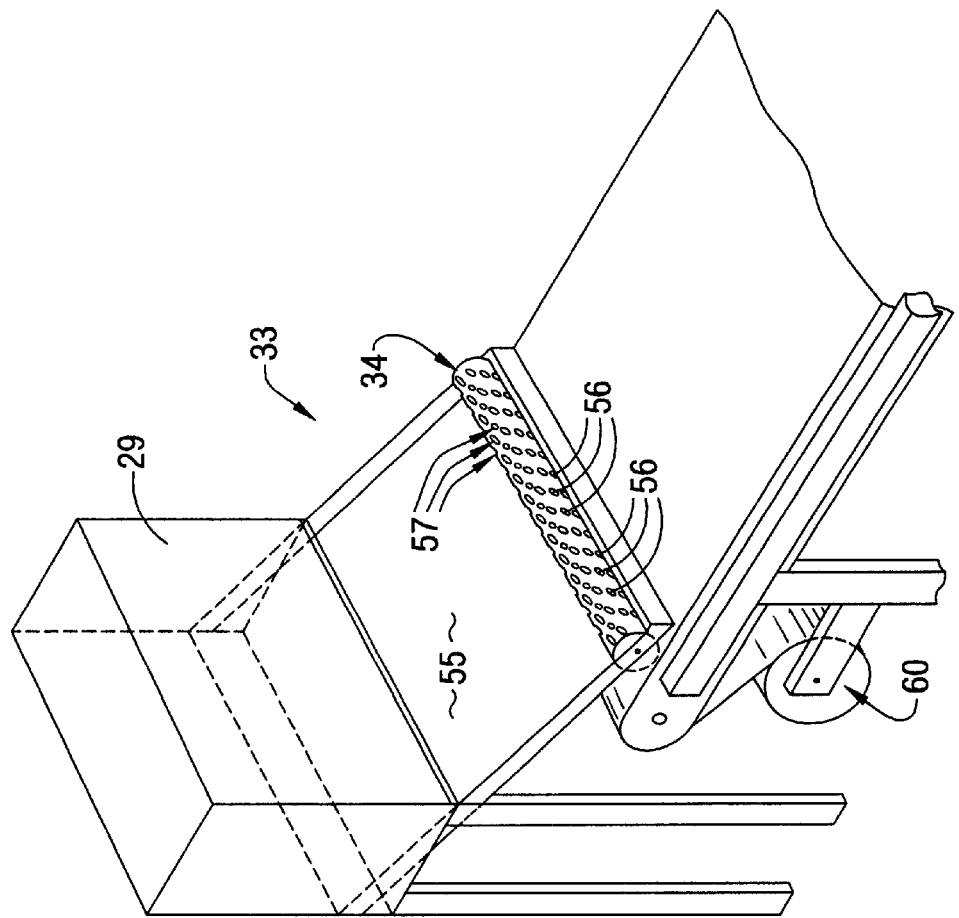
FIG. 4 is a perspective view which illustrates the sinker locating apparatus.

As illustrated in FIG. 4, sorting and location station 33 is disposed at the lower end of a guide chute 55 which accepts the feed from the dipping station 31 via the collection bin 20. At the bottom of the chute 55 there is provided a roller 34 having a perforated surface formed by staggered rows of recesses therein, each capable of holding a single body 11 and transferring the held bodies to a lower position, adjacent the leading end of the conveyor 36, from which the sinker bodies fall uniformly thereto.

For sinkers of elongate form the recesses in the roller 34 have their longitudinal axis disposed parallel to the roller axis so that the sinkers may be rolled in unison along the conveyor 36.

A consumable roll of automotive fire-rated masking tape 60 is supported beneath the conveyor 36 and is fed, sticky side up onto the conveyor belt to cover and move with the conveyor 36. Sinker bodies falling thereon will not roll from their impacted position so that the order of the bodies 11 in the roll will be maintained.

For this purpose the surface speed of the roller 34 is substantially the same as the conveyor 36. The apertures 56 are arranged in staggered rows 57 with a minimum spacing of about 2 mm between apertures 56.

The staggered rows of bodies are carried through a first spray paint enclosure of conventional form with filters and extraction pumps. The masking tape 60 shields the conveyor belt and ensures the sinker bodies remain in formation during painting of the upper surface of their bodies.

After cooling during passage past the curing station 38, at which the temperature is maintained at about 120° C., and the cooling station 39, the part-painted bodies 11 are engaged with a relatively short overhead belt 24 driven independently by a motor and drive assembly 25 and which travels slightly faster than the conveyor 36 so as to cause the bodies to roll along the masking paper to be supported on their painted side and suitably in the sticky space vacated by another sinker. The speed of the belt 24 may be controlled to roll the sinkers one half turn or any number of turns onto their painted side to align with unpainted patches of paper for adherence thereto as required.

In this manner the fixed relative position of the bodies 11 on the covering tape 60 is maintained for passage through the second automatic spray paint booth 41 where the unpainted side of the sinkers are painted, suitably with a different colour to the opposite side. After passing through the further curing station 42 and cooling station 43, the sinkers strike a bar which strips them from the tape 60 and delivers them to storage bins.

A sprinkling station, not illustrated, may be disposed between the second painting booth 41 and the curing station 42 for sprinkling glitter onto the uncured painted surface of the sinker. This will enhance the appeal of the sinkers, as it provided the potential to attract fish. The drives for the various components are computer controlled and are selectively variable to enable different settings to be readily configured for different production runs.

The coated steel or like material sinkers of this invention may be manipulated by adults and children without concern about possible contamination and resultant health effects. Furthermore such sinkers will not runt and will be suitable for long term storage and re-use in a fisherman's tackle box even in an adverse salt water environment.

In addition, sinkers lost in a fish habitat and coated with an inert material, such as the epoxy resin coating as described above, will not provide a toxic input to the fish habitat. However in the event that the coating be ruptured or degraded over a period of submersion, the steel body will relatively quickly degrade without contaminating the habitat to the same extent as would conventional lead sinkers. In addition recovery of concentrations of discarded iron sinkers can be effected using magnetic recovery techniques.

It will of course be realised that while the above has been given by way of illustrative example of this invention, all such and other modifications and variations thereto as would be apparent to persons skilled in the art are deemed to fall within the broad scope and ambit of this invention as is defined in the appended claims.

What is claimed is:

1. A sinker comprising a non-toxic body of compressed metal powder defining a line passageway there through and a non-toxic barrier material coating all surfaces of the sinker body, wherein the barrier material comprises a water-reducible epoxy paint coating over walls of the passageway and a non-water reducible epoxy resin coating the remaining surface of the body.

2. A sinker body as claimed in claim 1, wherein the compressed metal powder comprises iron powder.

3. A sinker body as claimed in claim 1, wherein the body of compressed metal powder is sintered.

4. A sinker as claimed in claim 2 wherein the compressed metal powder contains a lubricant.

5. A sinker as claimed in claim 4, wherein the lubricant is zinc stearate.

6. A sinker as claimed in claim 1, wherein the barrier is applied in two passes to distinct parts of the body, a different color being applied in each pass.

* * * * *